May 10, 1960

C. B. ZIMMER 2,936,374

NON-CONTACTING THICKNESS GAUGE

Filed Feb. 24, 1955

INVENTOR.
CHARLES B. ZIMMER.
BY Ward, Neal, Haselton,
Orne & McElhannon
ATTORNEYS.

May 10, 1960

C. B. ZIMMER 2,936,374

NON-CONTACTING THICKNESS GAUGE

Filed Feb. 24, 1955

INVENTOR.
CHARLES B. ZIMMER.
BY Ward, Neal, Haselton,
Orme & McElhannon
ATTORNEYS.

May 10, 1960  C. B. ZIMMER  2,936,374
NON-CONTACTING THICKNESS GAUGE
Filed Feb. 24, 1955  3 Sheets-Sheet 3
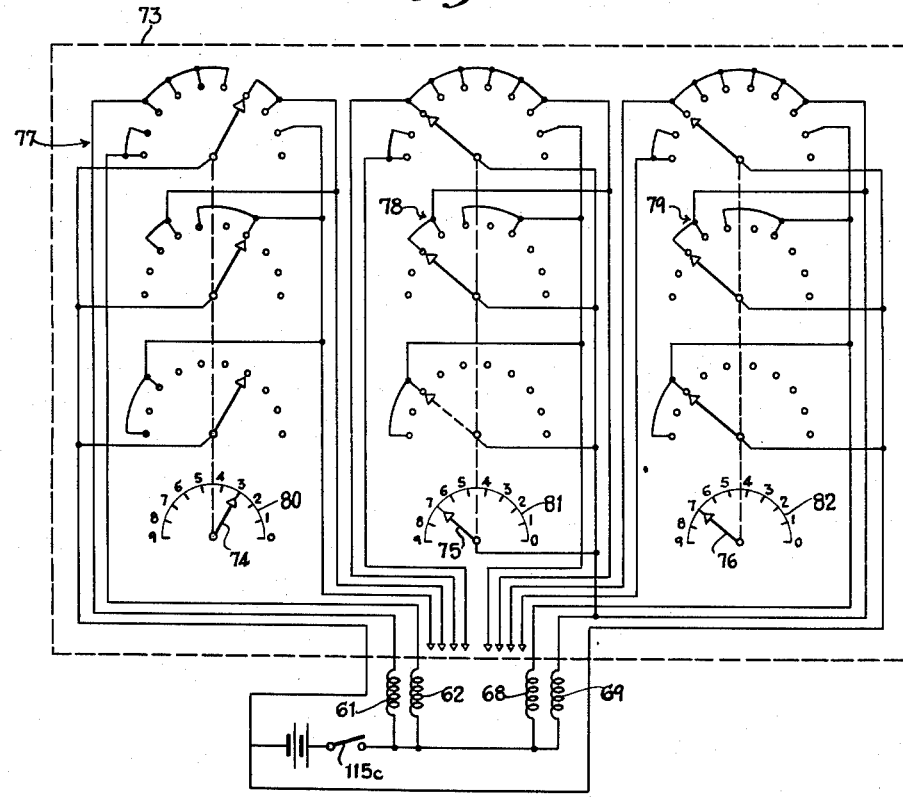
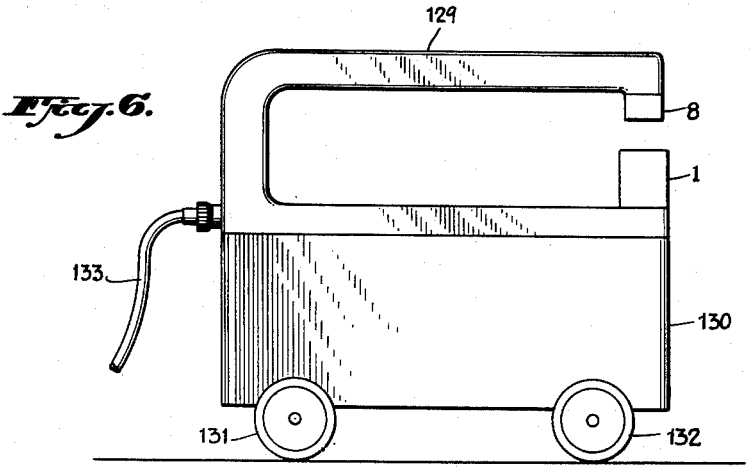
INVENTOR.
CHARLES B. ZIMMER.
BY Ward, Neal, Haselton,
Orme & McElhannon
ATTORNEYS.

United States Patent Office 2,936,374
Patented May 10, 1960

2,936,374

NON-CONTACTING THICKNESS GAUGE

Charles B. Zimmer, Englewood, N.J., assignor, by mesne assignments, to Daystrom, Incorporated, Murray Hill, N.J., a corporation of New Jersey Application February 24, 1955, Serial No. 490,279

10 Claims. (Cl. 250—83.3)

This invention relates to non-contacting measuring devices employing radiation such as X-rays or beta-rays and particularly to devices known as non-contacting X-ray gauges.

Manufacturers of metal strip, sheet, or plate, or foils of metallic or non-metallic nature are facing the problem of controlling with greater accuracy the thickness of their materials. The two fundamental reasons for narrowing the tolerances are the high cost of the raw material and the tighter specifications established by the users' requirements. These reasons have made imperative the measurement of the thickness of material in process.

To fulfill this task, several types of non-contacting gauges have been devised whose operation is based on the measurement of the difference in absorption of a radiation on such as X-rays or beta-rays between a sample of known thickness and a material of unknown thickness. In the early embodiments of the non-contacting gauge which included a variable intensity X-ray source and detector, the operator inserted a standard of known thickness manually in the beam and varied the intensity of the X-ray radiation in order to read zero on a null galvanometer. The material to be measured was then fed into the path of the beam and its thickness was determined by reading the plus or minus deflections on the scale of the null galvanometer.

It is one object of this invention to incorporate in a non-contacting gauge a unit having a set of standards which unit provides a simple means of inserting a standard of desired thickness, consisting of a single standard or of a combination of standards, into the measuring beam of radiation, and which unit is controlled by step control switches used in setting up the gauge to measure the material of unknown thickness. The said switches are manually positioned in such a manner that the value of the thickness indicated on the switch dials corresponds to the actual thickness of the standard which is inserted in the beam of radiation.

Another object of this invention is to provide a calibrator unit which adjusts the null galvanometer of the non-contacting gauge to a zero position, while any standard of known thickness included in the standards unit is in the radiation beam.

A further object of this invention is to provide a non-contacting gauge with a null galvanometer which can be read in units of deviation, or in decimal fractions of one inch, or in millimeters, as the nominal thickness of the material being measured is varied. This is accomplished by means of a step attenuation switch which can alter the signal which is generated within the detector, and such switch is directly connected to the thickness step control switch. Both of the step switches are manually positioned by means of the thickness setting dials in such a manner that the amplifier output is adjusted so that the material thickness variations from the standard desired thickness will be read in thousandths of an inch or in millimeters directly on the null galvanometer, regardless of the nominal thickness of the material being measured.

A still further object of this invention is to provide the gauge with a compensating knob which is a means for correcting variations between a sample and a material of same thickness having different X-ray absorption properties which are due to chemical variations between the two materials. The non-contacting gauge measures the difference of absorption due to thickness changes and also to variations of atomic number of the elements constituting the material examined within the radiating beam.

During the operation of the gauge, such as in a rolling mill, the atmosphere within the proximity of the X-ray source and of the detector is often heavily contaminated with fumes emanating from the hot metal and with water vapors. Scales, metallic oxides in the form of dust and chips are present in the beam of radiation and can also partially obstruct the X-ray window without the mill operator noticing it because the X-ray equipment may be located under the metal strip far away from reach. Such foreign matter introduces errors in the readings of a non-contacting gauge. This is particlularly true for the type of non-contacting gauge which employs two beams of radiation emitted from two different sources or from a single source of the split beam type, and in which one of the beams is used to measure the thickness "$a$" of a standard, such beam and standard being enclosed in a casing free from the surrounding mill contamination while the other beam is used to measure the thickness "$A$" of the metal strip. With such an arrangement the gauge measures "$x$," the thickness deviations, which is defined by the equation:

$$x = A - a \tag{1}$$

In case the X-ray window or the path of the X-ray beam is obstructed with foreign matter which has a thickness equivalent "$m$," the Equation 1 becomes:

$$x = A + m - a \tag{2}$$

The factor "$m$" not being known, the gauge readings will show an error equal to "$m$."

It is another object of this invention to provide a gauge which is independent of "$m$" or error due to foreign matter intercepted by the X-ray radiation beam which measures "$A$." The gauge of this invention utilizes a single beam of radiation with a single detector, and the gauge is operated in two consecutive steps. The gauge is used first to measure "$a$," then "$A$," with the same detector and with the same beam. However, if the foreign matter is present during both measurements, the Equation 1 becomes:

$$(A+m) - (a+m) = x \tag{3}$$

in which the error due to "$m$," is cancelled out.

The invention may be better understood by referring to the following detailed description of the manner in which I now prefer to practice the invention and to the accompanying drawings in which:

Fig. 5 is a circuit diagram of unit which controls the standards used in the embodiment of Fig. 1; and Fig. 6 is a schematic showing of a movable mounting for the X-ray source and the detector used in the embodiment of Fig. 1.

Figure 1:
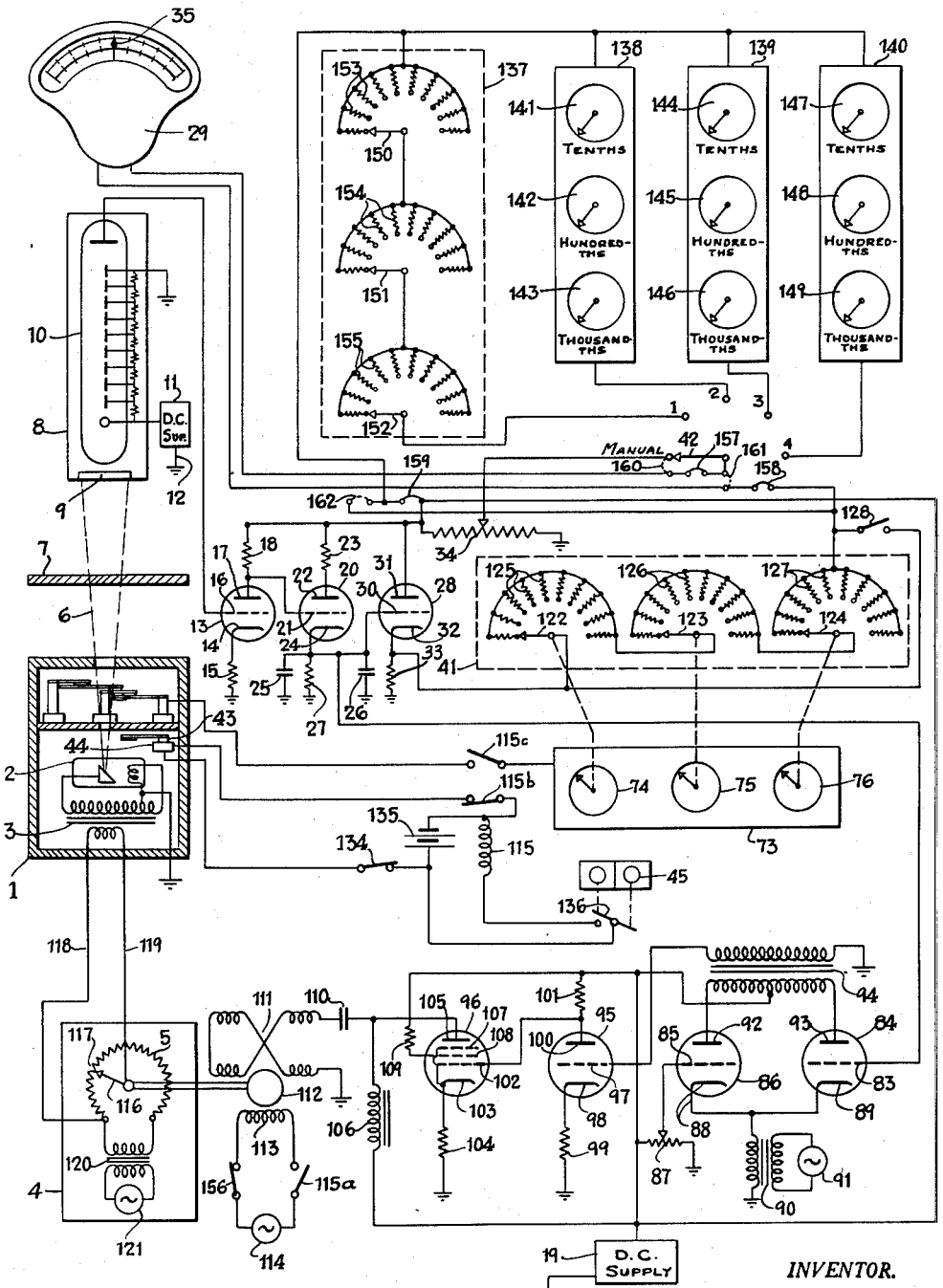
Fig. 1 is a circuit diagram of a preferred embodiment of the invention.

The embodiment of the gauge shown in Figure 1 comprises an X-ray source 1 which includes an X-ray tube 2 which is energized from a transformer 3. An alternating current power supply 4 whose output may be varied by the means of a potentiometer 5 supplies power to the transformer 3 in order to vary the intensity of X-rays generated in 1. The X-ray beam is represented in Figure 1 by the group of dotted lines 6 and the material 7 whose thickness is to be measured is disposed in the path of the X-rays 6. An X-ray detector 8 is also disposed in the path of the rays and may be of the scintillation type comprising a suitable phosphor scintillation material 9 and a photomultiplier tube 10. The tube 10 is connected to a high voltage, direct current power supply 11 the positive side 12 of which is grounded. The electrical signal generated by 10, which is dependent on the amount of X-rays reaching 9 after being partially absorbed through 7 is suitably amplified in an amplifier comprising tube 13. The cathode 14 of tube 13 is connected in series with biassing resisor 15 to ground. The control electrode or grid 16 is connected to the output of detector 8, and the anode 17 is connected through load resistor 18 to the positive terminal of the D.C. power supply 19. Although the amplifier has been shown as a single triode amplifier, it is to be understood that other forms of amplifiers may be employed. Furthermore, other types of detection apparatus may be substituted for the scintillation type described above.

The amplified electric signal at the output of the first amplifier is fed to a peak detector comprising tube 20 which provides an output signal proportional to the input signal. The control electrode or grid 21 of the tube 20 is connected to anode 17, and the anode 22 is connected to the power supply 19 through a resistor 23. The cathode 24 is connected to ground through a biassing network including capacitors 25 and 26 and resistor 27, although, if desired, one of the capacitors 25, 26 may be omitted.

The output signal from the peak detector is applied to a cathode follower comprising tube 28 to provide a low impedance source to operate a null galvanometer 29. The control electrode or grid 30 of the tube 28 is connected to one end of the resistor 27, the anode 31 is connected to the supply 19 and the cathode 32 is connected to ground through the output resistor 33.

Figure 2:
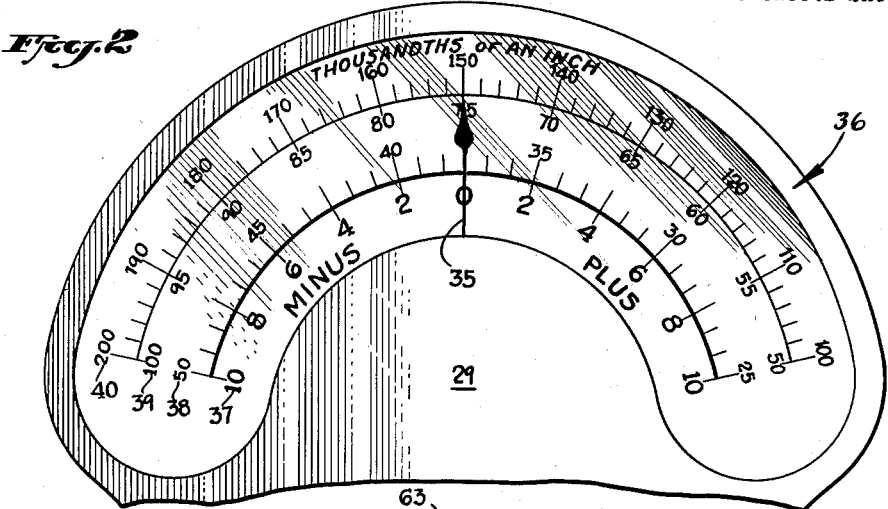
Fig. 2 is an enlarged view of one form of the scale markings used for the meter shown in Fig. 1.

The deflecting means of galvanometer 29 is controlled by two different signals, the first one being supplied by the cathode follower, above described, through calibration control unit or attenuating means 41 while the second signal is a reference voltage which, with switch 42 in the "manual" position shown, is taken from potentiometer 34 which is connected to the supply 19. Potentiometer 34 is operated manually and is used in setting up the gauge as well as for a means of varying the reference voltage to compensate for the chemical variations between the standards and the material whose thickness is to be evaluated. As shown in Figure 2, meter 29 is provided with an indicator needle 35 and with a scale 36 which preferably is provided with several sets of markings 37—40. The markings 37 are divided in two equal portions, negative and positive, on each side of a zero point. When needle 35 coincides with the zero point the reference voltage obtained from potentiometer 34 is equal to the X-ray signal generated by detector 8 and detected and amplified in the subsequent stages after passage of the X-rays through material 7. When the material becomes thicker, the X-ray absorption being greater and the output signal for detector 8 being smaller, needle 35 oscillates within the "plus" portion of the markings 37. In case the material becomes thinner, needle 35 will oscillates within the "minus" portion of the scale. The other markings on the scale 36 will be described hereinafter.

Figure 3:
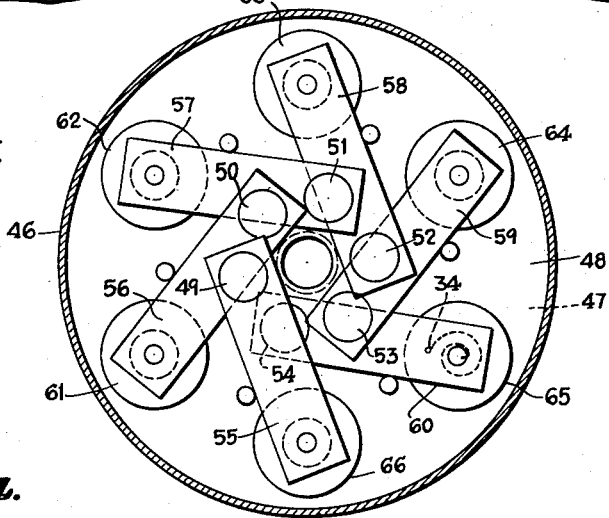
Figs. 3 and 4 are respectively top and side elevation views partly in cross section, of the standard unit used in the embodiment of Fig. 1.
Figure 4:
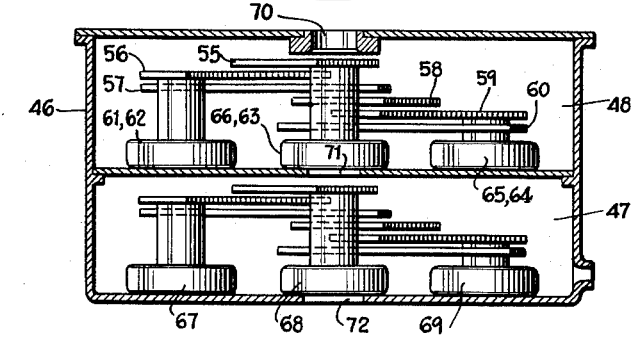

The X-ray source 1 is provided with a shutter 43 which is mounted on an arm operated by a solenoid 44. The shutter may be, for example, a thick plate of lead which swings above tube 2 to interrupt rays 6. Solenoid 44 is controlled by pushbuttons 45 and by a switch 134. A standards unit 46 is located in the upper part of source 1 and is shown in greater detail in Figures 3 and 4. Unit 46 comprises twelve standards which are divided between two decks 47 and 48, each one of the decks having six standards. Each one of the standards 49, 50, 51, 52, 53, 54 etc. is mounted on an arm 55—60 etc., which arms are movable by rotary solenoids 61—69, etc. which may be, for example, solenoids of the type known as "Ledex" rotary solenoids sold by G. G. Leland Inc. of Dayton, Ohio.

When a solenoid 61—69, etc is energized, its associated arm is swung into such a position that the standard carried thereby is situated in line with X-ray beam apertures 70, 71 and 72.

Referring again to Figure 1, the twelve different standards are inserted in the path of the rays 6 by means of a remote control panel 73 having three control knobs 74, 75 and 76 which operate three multi-deck switches having ten positions each. Figure 5 is a schematic diagram of the switches controlled at panel 73. Each one of the switches 77, 78 and 79 has a dial 80, 81 and 82 marked to indicate thicknesses in inches, although it will be understood that other markings may be employed. Dial 80 has markings correspondings to 0, .100", .200", .300" . . . .800", .900"; dial 81 has markings corresponding to 0, .010", .020", .030" . . . .080", .090" and dial 82 has markings corresponding to 0, .001", .002", .003", . . . .008", .009".

The twelve standards included in unit 46 have the following thicknesses:

Standard:
1 .................................................................. .001"
2 .................................................................. .002"
3 .................................................................. .004"
4 .................................................................. .008"
5 .................................................................. .010"
6 .................................................................. .020"
7 .................................................................. .040"
8 .................................................................. .080"
9 .................................................................. .100"
10 ................................................................. .200"
11 ................................................................. .400"
12 ................................................................. .800"

The thicknesses included are chosen on the basis of the binary system which in combination with the switches 77, 78 and 79 permits coverage of the entire thickness range from 0 to .999".

For instance, to insert standards having a combined thickness of .377" in the X-ray beam, knob 74 is positioned on .300" in order to energize the solenoids corresponding to the standards 9 and 10 to make .100"+.200". Knob 75 is positioned on 7 to position standards 5, 6, and 7 corresponding to the thicknesses .010"+.020" +.040", and knob 76 is positioned on 7 to energize the solenoids corresponding to the standards 1, 2 and 3 to corresponding to the thicknesses .001"+.002"+.004". In this case, 8 standards are inserted in the path of rays 6 to correspond to a thickness of .377". Of course, it is not necessary to restrict the system to a binary system, to 12 standards or to their disposition in two decks 47 and 48.

Referring again to Figure 1, the components that automatically adjust the gauge so that needle 35 reads or is positioned at the zero point, will now be described. It is understood that the zeroing of the needle 35 is performed each time any of the standards included within unit 46 are positioned in the X-ray beam so that zeroing is performed over the entire thickness range from 0 to .999" in steps of .001". Such automatic adjustment is accomplished by comparing the output signal of the X-ray detector with a standard signal and by using the difference between these two signals, if any, to operate a servo-mechanism which adjusts the intensity of the X-rays until the output of the detector has the desired value with the selected standard or standards in the path of the X-rays.

The electrical signal across resistor 27 of the alternating current peak detector is fed to grid 83 of tube 84 which forms part of a modulator. The grid 85 of tube 86 of the modulator is connected to potentiometer 87 which provides a reference voltage. The cathode 88 and 89 are connected in series with the secondary of a transformer 90 whose primary is connected to an alternating current source 91, e.g. a 60 cycle source. The anodes 92 and 93 are connected to the opposite ends of the primary winding of a transformer 94, the center tap of the primary winding being connected to the D.C. source 19. When the signals applied to the grids 83 and 85 are substantially equal, no signal appears across the secondary winding of transformer 94, whereas when the signals applied to the grids are unequal, a signal will be present across the secondary winding, the phase and amplitude of which will be determined by the relative magnitudes of the controlling signals.

The signal appearing across the secondary winding of the transformer 94 is amplified in a pair of amplifiers comprising tubes 95 and 96. The grid or control electrode 97 of tube 95 is connected to one end of the secondary winding and the opposite end of secondary winding is connected to ground. The cathode 98 of tube 95 is connected to ground through a biasing resistor 99. The anode 100 of tube 95 is connected to the D.C. source 19 through a load resistor 101 and is connected to the grid or control electrode 102 of the tube 96. The cathode 103 of the tube 96 is connected to ground through a biasing resistor 104 and its anode 105 is connected to the D.C. supply 19 through an inductor 106. Tube 96 also has conventional suppressor and screen electrodes 107 and 108 respectively, the suppressor electrode 107 being connected to the cathode 103 and the screen electrode 108 being connected to the D.C. supply 19 through a resistor 109. The anode 105 is coupled by means of a capacitor 110 to the windings 111 of a reversible motor having a rotor 112. The motor also has an exciting winding 113 which is connected to an alternating current source 114 when the armature 115a of a relay 115, hereinafter described, rests against its associated contact.

The rotor 112 is mechanically coupled to the contactor 116 of a potentiometer having a resistance winding 117, so that rotation of the rotor 112 varies the potential between the leads 118 and 119 which are connected to the primary of the transformer 3 which energizes the X-ray tube 2. The ends of the winding 117 are connected to the secondary of a transformer 120 whose primary is connected to a suitable source 121. Accordingly, rotation of the rotor 112 varies the excitation of the X-ray tube 2 and hence varies the intensity of the X-rays 6.

From the above it will be seen that when the signal applied to the grid 83 of tube 84 is less than the signal applied to the grid 85 of tube 86, the rotor 112 will rotate in such a direction that the excitation of X-ray tube 2 is increased and hence the intensity of X-rays 6 is increased. This in turn will increase the signal applied to the grid 83 until it is substantially equal to the signal on the grid 85 at which point the rotation of rotor 112 will cease. On the other hand, when the signal applied to the grid 83 is larger than the signal applied to the grid 85, a reverse process takes place causing a reduction in the intensity of the X-rays 6 and hence a reduction in the magnitude of the signal applied to the grid 83.

Referring to Fig. 2, if the markings 37 represent percentage deviation from a predetermined thickness, then the meter will read correctly with materials of different nominal thicknesses without the use of special compensating circuits. However, in some installations it is desirable to read the thickness of the material being measured or the deviation of the thickness from a nominal value in absolute units, i.e. fractions of an inch, millimeters, etc. It will be apparent that some means must be provided to permit such latter measurement if different markings for each nominal thickness are not provided. For example, if the nominal thickness is one hundred thousandths of an inch and full deflection of the needle 35 on either side of zero means a thickness change of ten percent, then the markings 37 would correctly indicate the thickness deviation in thousandths of an inch. On the other hand, if the nominal thickness is fifty thousandths of an inch, then the markings 37 would not indicate the thickness deviations in thousandths of an inch because full deflection of the needle 35 would be caused by only five thousandths of an inch deviation from the nominal thickness.

Accordingly, to permit the reading of the thickness or thickness deviations in absolute units on the meter 29, I provide calibration control unit 41 which is controlled from control panel 73 in such a manner than when the gauge is set to measure a material of a given thickness, resistors of the value necessary to cause markings 37 to indicate absolute units are connected in series with meter 29. Also, if the gauge is set to measure materials having nominal thicknesses of .0375 inch, .075 inch or .150 inch, the markings 38, 39 or 40 will indicate the thickness of the material in thousandths of an inch, although markings 38, 39 and 40 are intended primarily for a different use hereinafter described.

Calibration control unit 41 comprises a plurality of series connected switches 122, 123 and 124 which are mechanically connected to knobs 74, 75 and 76 respectively of the control panel 73 so as to be positioned by such knobs during selection of the standards in standards unit 46. The positions of the switches 122, 123 and 124 determine which of the resistors 125, 126 and 127 are connected in series between the resistor 33 and the meter 29.

A switch 128 is connected in parallel with the unit 41 so as to by-pass such unit when it is desired to read thickness deviations in percentage on the meter 29 or when the meter is used in connection with predetermined successive measurements hereinafter described.

The gauge is initially set up by removing the material 7 from the path of the X-rays 6. If the material 7 can be removed readily, the detector 8 and the X-ray source 1 may be mounted in fixed positions. However, if it is not a simple matter to remove the material 7 or if it is preferred, the detector 8 and the source 1 may be mounted on a carriage in the manner shown in Fig. 6. In Fig. 6, the detector 8 and the source 1 are mounted on the ends of the arms of a yoke member 129 which, in turn, is mounted on a movable carriage 130 having wheels 131 and 132. Electrical connections to detector 8 and the source 1 are made by means of a cable 133.

After the material 7 has been removed from the path of the X-rays 6, the X-ray tube 2 is energized. The shutter 43 is removed from the path of the X-rays 6 by opening a switch 134 which disconnects the solenoid 44 from the battery 135. Relay 115, which is also de-energized because switch 136, which is controlled by buttons 45, is in the "off" position. When relay 115 is de-energized armature 115B rests against its contact, armature 115C is released from its contact, de-energizing the solenoids which insert the standards in the path of the X-rays 6, and armature 115A, which controls the energization of the reversible motor, is released from its contact. With knobs 74, 75, and 76 in their zero positions or with switch 128 closed, and with switch 42 in the "manual" position indicated in Fig. 1, the potentiometer 34 is adjusted so that the needle 35 is approximately in its midpoint or "zero" position.

With knobs 74, 75 and 76 in their "zero" positions, switch 134 is then closed and switch 136 is operated to its "on" position so that relay 115 is energized. Potentiometer 87 is then adjusted until the intensity of the X-rays 6 is approximately half-way between their maximum intensity and their minimum intensity, it being noted that adjustment of the potentiometer 87 will cause rotation of the rotor 112 and adjustment of the voltage applied to the transformer 3 to energize the X-ray tube 2. With the potentiometer 87 adjusted as just described, potentiometer 34 is again adjusted until the needle 35 of the meter 29 is at its mid-point or "zero" position.

Assuming now that it is desired to set the gauge to measure material 7 having a thickness of fifty thousandths of an inch, the operator operates the switch 136 to its "off" position and makes certain that the switch 128 is open and that the switch 42 is in the "manual" position. The operator then sets the knobs 74, 75 and 76 to read .050 of an inch and operates the switch 136 to its "on" position. Because of the setting of the knobs 74, 75 and 76 and the operation of switch 136, the standards in unit 46 having a combined thickness of .050 of an inch will be inserted in the path of the X-rays 6 and the shutter 43 will be removed from the path of the X-rays 6. The signal generated by the detector 8, due to the impingement of the X-rays 6 thereon, will be detected and supplied to the grid 83 of the tube 84. The signal applied to the grid 83 will cause operation of the rotor 112 and hence will cause the energization of the X-ray tube 2 to vary until the intensity of the X-rays 6 is such that the motor is no longer energized and the needle 35 is at its "zero" position.

The gauge is now calibrated against the standards and the operator operates switch 136 to its "off" position, de-energizing the solenoids of the standards, de-energizing the relay 115 and de-energizing the motor which controls the excitation of the X-ray tube 2. The material 7 to be measured is inserted between the source 1 and the detector 8, and the switch 134 is opened, removing the shutter 43 from in front of the X-ray tube 2. The meter 29 will then indicate the difference in thickness of the material 7 from the thickness of the standards and will indicate such difference in thousandths of an inch as read from the markings 37 (Fig. 2). If it is desired to read percentage deviations from the thickness of the standard rather than thousandths of an inch, the switch 128 is closed.

It has been assumed in connection with the above description that the material 7 to be measured has the same X-ray absorption characteristics as the material of the standards. If this is not the case, the gauge is adjusted using the standards in the manner described above, and in addition, prior to using the gauge for measuring materials of unknown thicknesses, specimens of the latter materials of known thicknesses are inserted in the path of rays 6 in place of material 7 and potentiometer 34 is adjusted until the needle 35 reads "zero." A chart of the positions of the control knob for potentiometer 34 versus the material thicknesses is then made so that when the gauge is subsequently used to measure such material, the operator adjust potentiometer 34 to the position required before using the gauge to measure the material 7.

The thickness reduction of steel coils or other metals and alloys or the reduction of pipe wall thickness is frequently achieved on reversing mills in which material is reduced from its initial thickness to a finished product of thinner thickness by a step-reduction method. The steps in the step-reduction process are established by the metallurgist who provides the mill operator with the reduction schedule. Presently, in order to follow the reduction schedule, the operator before each step adjusts the setting of the rollers and also the settings of the thickness gauge. Since such setting must be repeated for each article worked, the process is not only undesirably lengthened but also subject to operator errors.

In addition to its use in the process described above, it may be desired to use the gauge in the measurement of articles of varying thickness. In both cases, it is desirable that the operator be able to shift from one range to another without operating a plurality of controls.

It is another object of this invention to provide a means of simplifying the adjustment of the non-contacting gauge while switching from one reduction range to another, or from one measuring range to another by merely turning a knob which controls circuits whose settings have been previously adjusted in compliance with the reduction schedule or thickness specifications.

Setting the gauge for the purpose of carrying out a step reduction process of the above-described type is accomplished by means of switch 42 and control boxes 137—140 which act as a plurality of adjustable sources of reference voltage. Each of the control boxes 137—140 includes a plurality of switches and a plurality of control knobs such as knobs 141—149. The switches and the associated resistors are shown in detail in Fig. 1 only in connection with control box 137 but it will be understood that control boxes 138—140 are the same as control box 137.

Control box 137 has three selecting switches 150, 151 and 152 by means of which it is possible to insert various ones of the resistors 153, 154 and 155 in series with meter 29 and between the leads which connect to the power supply 19 and the contact terminals of the switch 42. Thus, by setting the switches 150—152 it is possible to control the voltage applied to the meter 29 and to modify the reading of the meter 29 in the same manner as it was possible to modify the reading of meter 29 by using the control box 41.

Let it be assumed that a sheet of steel having a thickness of approximately .150 of an inch is to be reduced in three steps to a thickness of .020 of an inch. The scale of the meter 29 will then be marked as indicated in Fig. 2. Let it also be assumed that the gauge has been originally set up as set forth above. Switch 156 is in its "off" position, switch 157 is in its position shown, and switch 136 is closed. The operator will then close switch 128 to bypass the control box 41 and will first set the knobs 74, 75 and 76 to read .150 of an inch. Also, switch 42 is moved to contact marked "1" in Fig. 1. Switch 156 is opened to prevent operation of the motor which adjusts the intensity of the X-rays 6 and switch 136 is closed, causing removal of the shutter 43 from the path of the X-rays 6, and causing standards, whose thickness equals .150 of an inch, to be inserted in the path of the X-rays 6. Switches 150, 151 and 152 are then adjusted until the needle 35 of the meter 29 is at its mid-point or "zero" position. Switch 136 is then opened, knobs 74, 75 and 76 are adjusted to read .075 of an inch and switch 42 is moved to contact "2" indicated in Fig. 1. Switch 136 is closed and knobs 141—143 on control box 138 are adjusted until the needle 35 is again at its mid-point or "zero" position. A similar procedure is carried out for the other thickness values, namely .0375 and .020 of an inch, the control boxes 139 and 140 being used to set the needle 35 at its "zero" position for these latter thickness values. It will be noted that all of the above adjustments have been made with the material 7 removed from the path of the X-rays 6.

If desired, the control boxes 137—140 may be used to control the magnitude of the signal applied to the meter 29 rather than the magnitude of the reference voltage. In such case, bridges 157—159 shown in solid lines would be removed and bridges 160—162 shown in dotted lines would be added to insert the control boxes 137—140 selected by switch 42 in series between the output of the cathode follower and the meter 29, switch 128 being closed. The control boxes would then be adjusted in the manner described above.

The material 7 which is to be reduced by the step reduced process is then inserted between the source 1 and the detector 8. Switch 136 is operated to its "off" position and switch 134 is closed to remove the shutter 43 from the path of the X-rays 6. Switch 42 is moved to the contact "1" and the meter 29 will then read the thickness of the material 7. The material 7 is then processed, such as by rolling, and when it has been reduced sufficiently in thickness and it is necessary to adjust the processing apparatus, such as the rolling mill, the operator at the same time moves switch 42 to contact "2." The thickness of the material 7 will at this time be somewhere in the range from .075 to .100 of an inch so that the meter 29 will again read the thickness of the material 7 but the thickness will be read from the markings 39.

Each time that the processing apparatus is adjusted to reduce the thickness of the material 7, the operator moves the switch 42 to the next position and when the switch 42 is in the position "4," the operator will read the thickness of the material 7 from the markings 37 and will process the material 7 until the needle is approximately at its "zero" position.

It will be noted from the above description that with each major change in the thickness of the material 7 it is necessary to move only a single knob of the switch to reset the gauge so that it will indicate correctly the thickness of material 7. Accordingly, the operation of the gauge is simplified as compared with gauges requiring recalibration of the gauge with each change in setting thereof and requiring the setting of several knobs or switches.

It will be apparent that the reduction steps of other magnitudes may be employed instead of the steps described above and that a greater or lesser number of steps may be employed. Also if desired, the calibration of the gauge may be rechecked at periodic intervals in the manner described above in connection with the setting of the gauge prior to the commencement of the step reduction process.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A gauge for measuring the thickness of materials with radiation which penetrates said materials, said gauge comprising means for producing said radiation, a plurality of standards comprising material of predetermined thicknesses which is penetrable by said radiation, means for inserting said standards in the path of said radiation, means for selectively operating said inserting means, means mounted in the path of said radiation for generating an electrical signal in response to impingement of said radiation thereon, indicating means, a plurality of signal attenuating means and means for selectively connecting different ones of said attenuating means and said indicating means to said generating means.

2. A gauge for measuring the thickness of materials with radiation which penetrates said materials, said gauge comprising means for producing said radiation including means for adjusting a characteristic of said radiation, a plurality of standards comprising material of predetermined thicknesses which is penetrable by said radiation, means for inserting said standards in and removing said standards from the path of said radiation, means for selectively operating said inserting means, means mounted in the path of said radiation for generating an electrical signal in response to impingement of said radiation thereon, indicating means connected to said generating means and responsive to said signal, and control means connected to said generating means and controllable by said signal and connected to said adjusting means for adjusting said characteristic under control of said signal, said control means also being controlled by said operating means, said operating means rendering said control means operative when a standard is in said path and rendering said control means inoperative when said standards are removed from said path.

3. A gauge for measuring the thickness of materials with radiation which penetrates said materials, said gauge comprising means for producing said radiation, a plurality of standards comprising material of predetermined thicknesses which is penetrable by said radiation, means for inserting said standards in the path of said radiation, means for selectively operating said inserting means, means mounted in the path of said radiation for generating an electrical signal in response to impingement of said radiation thereon, means for controlling the level of said signal connected to said generating means and connected to and controlled by said means for selectively operating said inserting means and indicating means connected to one of said generating and said controlling means and responsive to said signal.

4. An X-ray gauge comprising means for producing X-rays, a plurality of standards comprising X-ray penetrable material of predetermined thicknesses, means for inserting said standards in the path of said X-rays, means for selectively operating said inserting means, means mounted in the path of said X-rays for generating an electrical signal in response to impingement of X-rays thereon, means for controlling the level of said signal connected to said generating means and connected to and controlled by said means for selectively operating said inserting means and indicating means connected to said controlling means and responsive to said signal.

5. An X-ray gauge comprising means for producing X-rays including means for adjusting a characteristic of said X-rays, a plurality of standards comprising X-ray penetrable material of predetermined thicknesses, means for inserting said standards in the path of said X-rays, means for selectively operating said inserting means, means mounted in the path of said X-rays for generating an electrical signal in response to impingement of X-rays thereon, means for controlling the level of said signal connected to said generating means and connected to and controlled by said means for selectively operating said inserting means, indicating means connected to one of said generating and said controlling means and responsive to said signal, and control means connected to said generating means and controlled thereby and connected to said adjusting means for adjusting said characteristic under control of said signal.

6. An X-ray gauge comprising means for producing X-rays, a plurality of standards comprising X-ray penetrable material of predetermined thicknesses, means for inserting said standards in the path of said X-rays, means responsive to said X-rays mounted in said path for generating an electrical signal in response to impingement of said X-rays thereon, an electrically operable indicator, a plurality of sources of reference voltage, and switching means for connecting different ones of said sources and said indicator in series with said generating means.

7. An X-ray gauge comprising means for producing X-rays including means for adjusting the intensity of said X-rays a plurality of standards comprising X-ray penetrable material of predetermined thicknesses, means for inserting said standards in the path of said X-rays, first switching means for selectively operating said inserting means and for thereby inserting standards of selected thickness in said path of said X-rays, means responsive to said X-rays mounted in said path for generating an electrical signal in response to impingement of said X-rays thereon, an electrically operable indicator, an adjustable source of reference voltage connected to said indicator, adjustable attenuating means connectible between said generating means and said indicator for operating said indicator by said signal, said attenuating means being connected to said first switching means and being operable thereby, control means connected to said means for adjusting the intensity of said X-rays for controlling the adjustment thereof and means for interconnecting said generating means and said control means for causing operation of said adjusting means under control of said signal.

8. An X-ray gauge comprising means for producing X-rays including means for adjusting the intensity of said X-rays, a plurality of standards comprising X-ray penetrable material of predetermined thicknesses, solenoid means for inserting said standards in the path of said X-rays, first switching means for selectively operating said solenoid means and for thereby inserting at least one standard of selected thickness in said path of said X-rays, means responsive to said X-rays mounted in said path for generating an electrical signal in response to impingement of said X-rays thereon, detecting means connected to said generating means for detecting said signal, an indicating meter having a needle and a scale and means for deflecting said needle, an adjustable source of reference voltage connected to said deflecting means for deflecting said needle in a first direction, adjustable attenuating means connectible between said detecting means and said deflecting means for causing deflection of said needle by said signal in a second direction, said attenuating means being connected to said first switching means and being operable thereby whereby said scale indicates thickness of material in said path in absolute units at different settings of said first switching means, motor means connected to said means for adjusting the intensity of said X-rays, control means connected to said motor means for controlling the operation thereof and means for interconnecting said detecting means and said control means for causing operation of said adjusting means under control of said signal whereby the intensity of said X-rays is adjusted so as to maintain said signal at a predetermined level at different settings of said first switching means.

9. An X-ray gauge comprising means for producing X-rays including means for adjusting the intensity of said X-rays, a plurality of standards comprising X-ray penetrable material of predetermined thicknesses, solenoid means for inserting said standards in the path of said X-rays, first switching means for selectively operating said solenoid means and for thereby inserting standards of selected thickness in said path of said X-rays, means responsive to said X-rays mounted in said path and spaced from said producing means for generating an electrical signal in response to impingement of said X-rays thereon, amplifying and detecting means connected to said generating means for amplifying and detecting said signal, an indicating meter having a needle and a scale and means for deflecting said needle, a plurality of adjustable sources of reference voltage, second switching means selectively connectible to said deflecting means and to said sources for connecting said sources to said deflecting means for deflecting said needle in a first direction, adjustable attenuating means connectible between said amplifying and detecting means and said deflecting means for causing deflection of said needle by said signal in a second direction, said attenuating means being connected to said first switching means and being operable thereby whereby said scale indicates thickness of material in said path in absolute units at different settings of said first switching means, reversible motor means connected to said means for adjusting the intensity of said X-rays, control means connected to said motor means for controlling the operation thereof and means for interconnecting said amplifying and detecting means and said control means for causing operation of said adjusting means under control of said signal whereby the intensity of said X-rays is adjusted so as to maintain said signal at a predetermined level at different settings of said first switching means.

10. An X-ray gauge comprising means for producing X-rays including means for adjusting the intensity of said X-rays, a plurality of standards, each comprising X-ray penetrable material of a predetermined thickness, the thickness of the material of each standard differing from the thickness of the material of the remaining standards, solenoid means for inserting said standards in the path of said X-rays, first switching means for selectively energizing said solenoid means and for thereby inserting standards of selected thickness in said path of said X-rays, means responsive to said X-rays mounted in said path and spaced from said producing means for generating an electrical signal in response to impingement of said X-rays thereon, amplifying and detecting means connected to said generating means for amplifying and detecting said signal, an indicating meter having a needle and a scale and means for deflecting said needle, a plurality of adjustable sources of reference voltage, second switching means selectively connectible to said deflecting means and to said sources for connecting said sources to said deflecting means for deflecting said needle in a first direction adjustable attenuating means connectible between said amplifying and detecting means and said deflecting means for causing deflection of said needle by said signal in a second direction, said attenuating means being connected to said first switching means and being operable thereby whereby said scale indicates thickness of material in said path in absolute units at different settings of said first switching means, third switching means for bypassing said attenuating means and for thereby connecting said amplifying and detecting means directly to said deflecting means, reversible motor means connected to said means for adjusting the intensity of said X-rays, control means connected to said motor means for controlling the operation thereof and means for interconnecting said amplifying and detecting means and said control means for causing operation of said adjusting means under control of said signal whereby the intensity of said X-rays is adjusted so as to maintain said signal at a predetermined level at different settings of said first switching means.

References Cited in the file of this patent

UNITED STATES PATENTS

| | | |
|---|---|---|
| 2,467,812 | Clapp | Apr. 19, 1949 |
| 2,565,734 | Lundahl | Aug. 28, 1951 |
| 2,669,662 | Lundahl | Feb. 16, 1954 |
| 2,723,350 | Clapp | Nov. 8, 1955 |

OTHER REFERENCES

"An X-Ray Thickness Gauge for Hot Strip Rolling Mills," by Clapp and Phol, AIEE Transactions, 1948, vol. 67, pages 620 to 625.

"X-Ray Thickness Gauge for Cold-Rolled Strip Steel," by Lundahl, AIEE Transactions, 1948, vol. 67, pages 83 to 90.

"Thickness Gauging by Radiation Absorption Methods," by Clapp and Bernstein, General Electric Review, November 1950, pages 39 to 42.